No. 814,399. PATENTED MAR. 6, 1906.
G. E. SAVAGE.
COFFEE PERCOLATOR.
APPLICATION FILED JAN. 13, 1905.

2 SHEETS—SHEET 1.

Witnesses
Chas A Picard
R P S Allen

Inventor
George E. Savage.
By His Attorneys
Barlow Brimmer & Hulbert

No. 814,399. PATENTED MAR. 6, 1906.
G. E. SAVAGE.
COFFEE PERCOLATOR.
APPLICATION FILED JAN. 13, 1905.

2 SHEETS—SHEET 2.

Witnesses

Inventor
George E. Savage
By His Attorneys

UNITED STATES PATENT OFFICE.

GEORGE E. SAVAGE, OF MERIDEN, CONNECTICUT, ASSIGNOR TO MANNING, BOWMAN & COMPANY, OF MERIDEN, CONNECTICUT, A CORPORATION OF CONNECTICUT.

COFFEE-PERCOLATOR.

No. 814,399.     Specification of Letters Patent.     Patented March 6, 1906.

Application filed January 13, 1905. Serial No. 240,8͟.

*To all whom it may concern:*

Be it known that I, GEORGE E. SAVAGE, a citizen of the United States, residing at Meriden, county of New Haven, State of Connecticut, have invented certain new and useful Improvements in Coffee-Percolators, of which the following is a full, clear, and exact description.

My invention relates to improvements in coffee-pots, teapots, and the like, and particularly to what is known as "percolators."

The object of the invention is to provide a construction the parts of which are securely attached together when assembled and which avoids the danger of overheating or of annoying and dangerous accumulation and escape of steam or increase of pressure.

I have endeavored to make the parts as simple and inexpensive of construction as possible, while maintaining strength, adaptability to assembling, and efficiency of operation.

The invention consists in improvements, the principles of which are illustrated in the accompanying two sheets of drawings.

Figure 1:
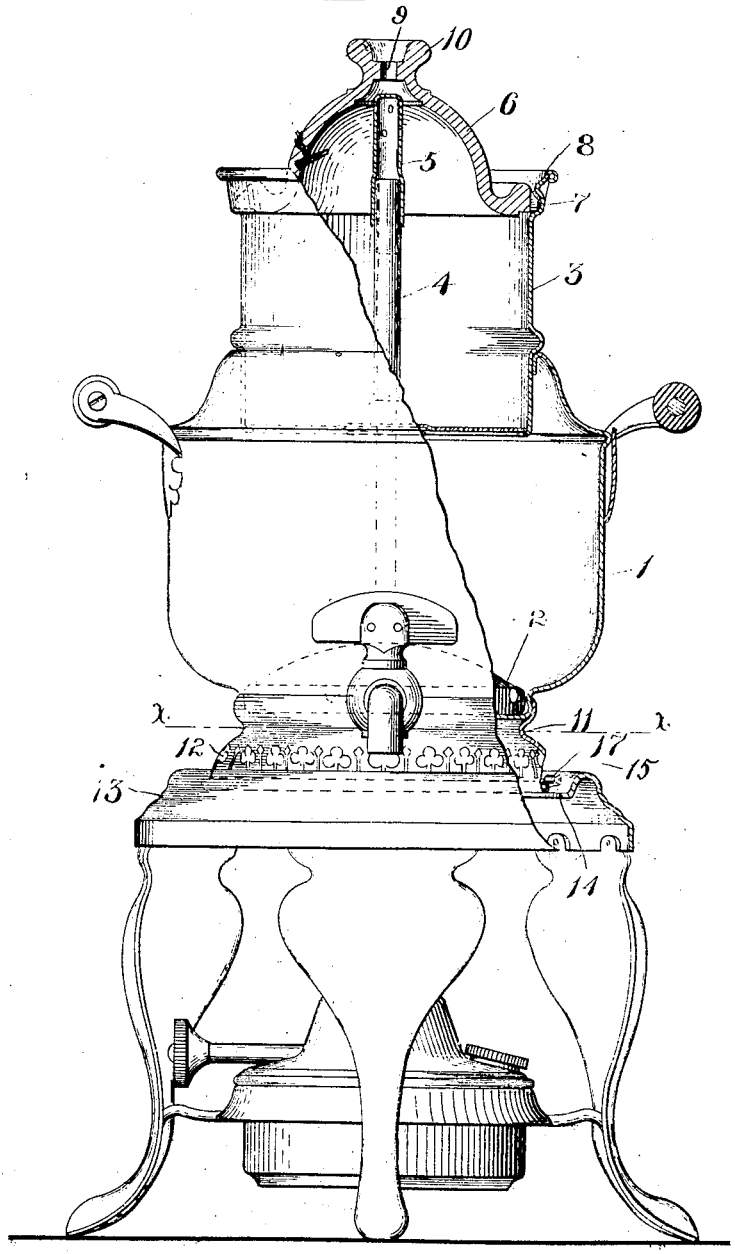
Figure 2:
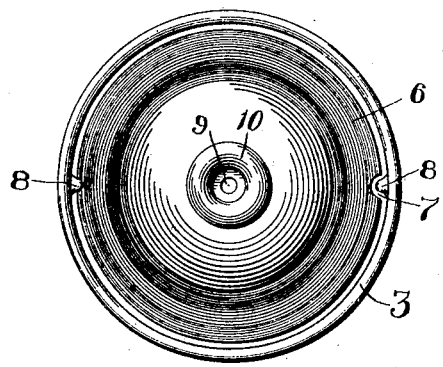
Figure 3:
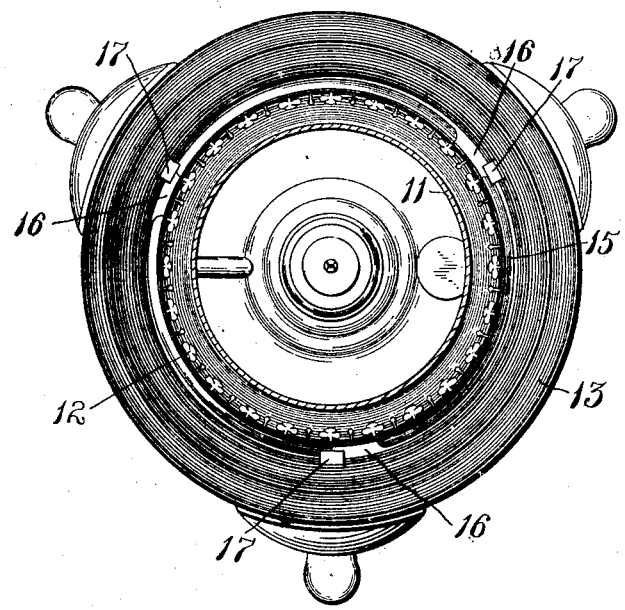

Figure 1 is a side elevation of a percolator involving the improvements of my invention, parts of the same being broken away to show the interior construction. Fig. 2 is a plan view of the coffee-receptacle with its cover. Fig. 3 is a horizontal cross-section and plan on the plane of the line X X of Fig. 1.

1 represents the body of the coffee-pot, which is formed, preferably, of sheet metal. This is in the form shown provided with handles and a suitable spout or spigot.

2 is a hollow bell which rests on the bottom of the body and has a series of openings around its base, through which the fluid circulates during the operation. This is provided with the usual percolator-tube.

3 is the coffee or tea receptacle, which has a perforated bottom or strainer and is removably seated within the rim at the top of the pot. This is preferably constructed of sheet metal similar to the body. The sleeve 4 is preferably secured to the bottom of the receptacle 3 and affords a centering and guiding device for as well as an extension of the percolator-tube.

5 is a tip which fits easily onto the upper end of the sleeve 4 and has a number of lateral perforations, through which hot water and any steam generated in the reservoir beneath the bell 2 is forced. This tip is removable from the sleeve 4, but may be removed with the sleeve 4 when the receptacle is taken out of the body.

6 is a cover which is formed of glass and transparent. Through this cover the operation of the percolator may be observed. The interior of the cover is dome-shaped adjacent the perforations in the tip 5 and serves to direct the stream of hot water and any products of condensation downward, so that the fluid will drip upon the contents of the receptacle 3, percolate through, and thus ultimately form the beverage in the body portion or reservoir 1.

7 indicates a recess or passage in the edge of the cover.

8 8 indicate projections or indentations from the metal of the rim of the receptacle 3.

The dimensions of the parts are such that the cover may be easily removed when in the position shown in Figs. 1 and 2 or locked in position by simply rotating it through a slight angle, so that the cover cannot be raised by a sudden pressure of steam or fall off in case the percolator is tipped up.

A perforation or passage 9 is provided in the top of the cover which is surrounded by a cup-shaped portion 10. Any excessive pressure within the receptacle 3 is thus relieved through the cover 6, preventing accident. This is particularly advantageous in those forms of coffee-pots having curved spouts without a valve, in which constructions the pressure often forces the fluid out of the spout. The condensation immediately around the mouth of the passage 9 is collected in the cup 10 and immediately runs back into the receptacle. In a similar way any steam which escapes through the passage 7 will be condensed within the rim of the receptacle 3 and gradually worked back into the receptacle, thus preventing condensation of moisture on the outer surface of the parts.

11 is an annular base-ring which extends downward from the body portion. This is separately formed, but attached onto the side wall of the body so as to be permanently a part thereof. This is preferably provided with a series of lateral perforations 12 for the circulation of air to prevent overheating.

13 is a top ring of the stand or tripod, which has a supporting-rim 14, which is preferably depressed slightly.

The lower edge of the base-ring 11 is upturned at 15, thus forming a very rigid reinforcement at this point on which the pot rests. This reinforcing upturned edge 15 is cut away at 16, forming a recess or passage.

17 is a projection or indentation from the metal of the stand-ring 13.

A projection 17 is preferably provided opposite each leg of the stand and to correspond with a similar number of passages 16. When the parts are in position as shown in Fig. 1, the body may be removed from the stand by lifting it. It may be locked to the stand by turning it slightly, (in either direction,) as indicated in Fig. 3, in which position the body and stand are secured together. For convenience in pouring from a pot having a spigot, as herein shown, it is preferable that the body be turned about until the spigot stands directly midway between two of the legs of the stand.

The many advantages of this construction will be understood by those skilled in the art. While the parts are simple, they may nevertheless be securely attached together or taken apart, as desired. The particular form of connection between the base-ring and the stand has the advantages of strength and durability over anything known in the art.

What I claim is—

1. A coffee-percolator comprising the combination of a stand having a top ring with a supporting rim or flange, a plurality of projections extending inward laterally from said ring slightly above the supporting-rim, a fluid-holding body having an imperforate bottom, a percolator-bell forming a compression-chamber above the bottom, an annular base-ring extending downwardly below the bottom and united with said body, an annular flanged reinforcing lower edge integral with said base-ring having a plurality of vertical passages in the flange corresponding with the projections on the stand-ring, whereby the parts may be securely locked together or readily separated, substantially as described and for the purpose specified.

2. In a device of the character described, the combination of a stand having a series of lateral projections, a fluid-holding body, a base-ring separately formed but permanently secured thereto and having an upturned lower edge with a series of vertical passages, all adapted to lock on the stand substantially as described, said base-ring also having a series of lateral perforations for the circulation of air.

3. In a device of the character described, the combination of a fluid-holding body portion, a receptacle mounted therein, a transparent dome-shaped glass cover for said receptacle having a perforation for relieving the pressure within said receptacle, and an annular rim around said passage for collecting condensation.

4. In a device of the character described, the combination of a fluid-holding body portion, a percolator-tube, a receptacle mounted in said body, a tip having a series of lateral perforations for the escape of hot water and steam and a dome-shaped transparent glass cover having a central perforation for relieving the pressure within said receptacle, said laterally-perforated tip being located within said dome and directly beneath said central perforation.

Signed at Meriden, Connecticut, this 9th day of January, 1905.

GEO. E. SAVAGE.

Witnesses:
A. L. STETSON,
E. J. POOLEY.